(12) United States Patent
Yamamoto et al.

(10) Patent No.: US 11,491,903 B2
(45) Date of Patent: Nov. 8, 2022

(54) SYSTEM AND METHOD FOR ALLEVIATING SENSORY CONFLICT IN A VEHICLE

(71) Applicant: Honda Motor Co., Ltd., Tokyo (JP)

(72) Inventors: Stuart Masakazu Yamamoto, La Mirada, CA (US); Hartley Ochavillo, Marina Del Rey, CA (US); Joseph Anthony Alequin, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 781 days.

(21) Appl. No.: 16/384,001

(22) Filed: Apr. 15, 2019

(65) Prior Publication Data

US 2020/0324675 A1 Oct. 15, 2020

(51) Int. Cl.
*B60N 2/90* (2018.01)
*B60N 2/00* (2006.01)

(52) U.S. Cl.
CPC ............... *B60N 2/90* (2018.02); *B60N 2/002* (2013.01)

(58) Field of Classification Search
CPC ....... B60W 2540/22; B60W 2540/221; B60W 2540/223; B60W 2540/24; B60W 2540/26; B60W 50/0098; B60W 40/08; B60W 2040/0818; B60W 50/14; B60W 2050/143; B60W 2050/146; B60W 50/16; B60N 2/914; G10K 11/16
See application file for complete search history.

(56) References Cited

U.S. PATENT DOCUMENTS

| 5,321,617 A | 6/1994 | Mori et al. |
| 9,573,522 B2 | 2/2017 | James |
| 9,902,403 B2 | 2/2018 | Donnelly et al. |
| 10,095,229 B2 * | 10/2018 | Myers .................. G06Q 50/30 |

(Continued)

FOREIGN PATENT DOCUMENTS

| CN | 206551917 | 10/2017 |
| JP | 2006027347 | 2/2006 |

(Continued)

OTHER PUBLICATIONS

JP2006027347A_-_Riding_quality_improving_device_-_Google_Patents.pdf (Year: 2021).*

*Primary Examiner* — Thomas Ingram
*Assistant Examiner* — Faris Asim Shaikh
(74) *Attorney, Agent, or Firm* — Rankin, Hill & Clark LLP (57) ABSTRACT

A system and method for alleviating sensory conflict in a vehicle are provided. According to one aspect, a computer-implemented method for alleviating sensory conflict in a vehicle is provided. The method includes identifying a sensory conflict for a vehicle occupant based on a sensory event at a location. The method also includes determining an inurement action to alleviate an impact of the sensory conflict on the vehicle occupant. The method further includes determining an actuation schedule for performing the inurement action an N number of times for a predetermined amount of time. The method yet further includes controlling a haptic device to perform the inurement action according to the activation schedule in response to the vehicle occupant being located in a seat of the vehicle.

15 Claims, 5 Drawing Sheets

(56) References Cited

U.S. PATENT DOCUMENTS

| | | | |
|---|---|---|---|
| 2009/0164073 A1* | 6/2009 | Mabuchi | B60N 2/14 |
| | | | 701/49 |
| 2017/0313326 A1* | 11/2017 | Sweeney | B60N 2/14 |
| 2018/0161537 A1 | 6/2018 | Ketels et al. | |
| 2018/0162186 A1 | 6/2018 | Anderson et al. | |
| 2019/0022347 A1 | 1/2019 | Wan et al. | |

FOREIGN PATENT DOCUMENTS

| | | | | |
|---|---|---|---|---|
| JP | 2006027347 A | * | 2/2006 | A61M 21/02 |
| KR | 20150045164 | | 4/2015 | |
| KR | 20190003196 | | 1/2019 | |
| WO | 2017215781 | | 12/2017 | |
| WO | 2018070330 | | 4/2018 | |
| WO | 201917215 | | 1/2019 | |

* cited by examiner

SYSTEM AND METHOD FOR ALLEVIATING SENSORY CONFLICT IN A VEHICLE

BACKGROUND

When there is a discontinuity between a person's senses, the resulting sensory conflict can cause the person to feel ill. For example, motion is sickness is caused when a person does not see movement but feels movement. This may occur when a person is reading in a vehicle that is moving. The words are perceived to be still on the page, but the vehicle occupant can feel the relative motion of the vehicle. The relative motion of the vehicle may intensify based on the location of the vehicle. Additionally, the vehicle occupant may suffer a sensory conflict before entering a vehicle that is compounded by the relative motion of the vehicle.

BRIEF DESCRIPTION

According to one aspect, a computer-implemented method for alleviating sensory conflict in a vehicle is provided. The method includes identifying a sensory event based on data from the vehicle systems or vehicle sensors of the vehicle. The method also includes identifying a sensory conflict for a vehicle occupant based on a sensory event at a location. The method also includes determining an inurement action to alleviate an impact of the sensory conflict on the vehicle occupant. The method further includes determining an actuation schedule for performing the inurement action an N number of times for a predetermined amount of time. The method yet further includes controlling a haptic device to perform the inurement action according to the activation schedule in response to the vehicle occupant being located in a seat of the vehicle.

According to another aspect, a system for alleviating sensory conflict in a vehicle is provided. The system includes a processor having a sensory conflict module, an inurement module, a schedule module, and a control module. The sensory conflict module identifies a sensory conflict for a vehicle occupant based on a sensory event at a location. The inurement module determines an inurement action to alleviate an impact of the sensory conflict on the vehicle occupant. The schedule module determines an actuation schedule for performing the inurement action an N number of times for a predetermined amount of time. The control module controls a haptic device to perform the inurement action according to the activation schedule in response to the vehicle occupant being located in a seat of the vehicle.

According to still another aspect, a non-transitory computer readable storage medium stores instructions that when executed by a processor causes the computer to perform a method. The method includes identifying a sensory conflict for a vehicle occupant of a vehicle based on a sensory event at a location. The method also includes determining an inurement action to alleviate an impact of the sensory conflict on the vehicle occupant. The method further includes determining an actuation schedule for performing the inurement action an N number of times for a predetermined amount of time. The method yet further includes controlling a haptic device to perform the inurement action according to the activation schedule in response to the vehicle occupant being located in a seat of the vehicle.

DETAILED DESCRIPTION

Generally, the systems and methods disclosed herein are directed to alleviating sensory conflict in a vehicle. In particular, the systems and methods described herein address the sensory conflict experienced by a vehicle occupant by desensitizing the vehicle occupant to the sensory event responsible for causing the sensory conflict. In particular, haptic devices located in the vehicle can provide an inurement action that simulates motion associated with the sensory event. For example, suppose the vehicle is traveling along a windy highway. The haptic devices can prepare the vehicle occupant for windy conditions that cause the vehicle to move laterally on the roadway. For example, the haptic devices may provide inurement actions that simulate the lateral movements to accustom the driver to the effects of the windy conditions.

The inurement action may be short in length but provided repeatedly. In some embodiments, the inurement actions may be initially provided with less intensity and intensify as the inurement actions are repeated. In embodiments, where the sensory conflict has already occurred, the intensity of the inurement actions can be decreased and the inurement actions can be separated by increasing lengths of time. Thus, the vehicle occupant may slowly conditioned to not expect the sensory conflict previously caused by the sensory events. Accordingly, the systems and methods disclosed herein are directed to alleviating sensory conflict by providing inurement action to the vehicle occupant according to an actuation schedule to either accustom the vehicle occupant to the sensory event or to reduce the sensory conflict being experienced by the vehicle occupant.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Haptic devices," as used herein can include, devices that provide a tactile sensation to a biological entity, such as a vehicle occupant. The haptic device may provide communication between the biological entity and a computer via sensations. In one embodiment, the haptic devices may be utilized to provide various types of sensations including vibrations and movements (e.g., lateral movement, vertical movement, forward movement, backward movement, etc.), among others. The haptic devices may provide the sensations in various manners including intensities, varying periods of time, at different points in time, etc. Haptic devices may include, but are not limited to, eccentric rotating mass (ERM) elements, linear resonant actuators elements, air filled elements, liquid filled elements, and the like.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR- RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Figure 1:
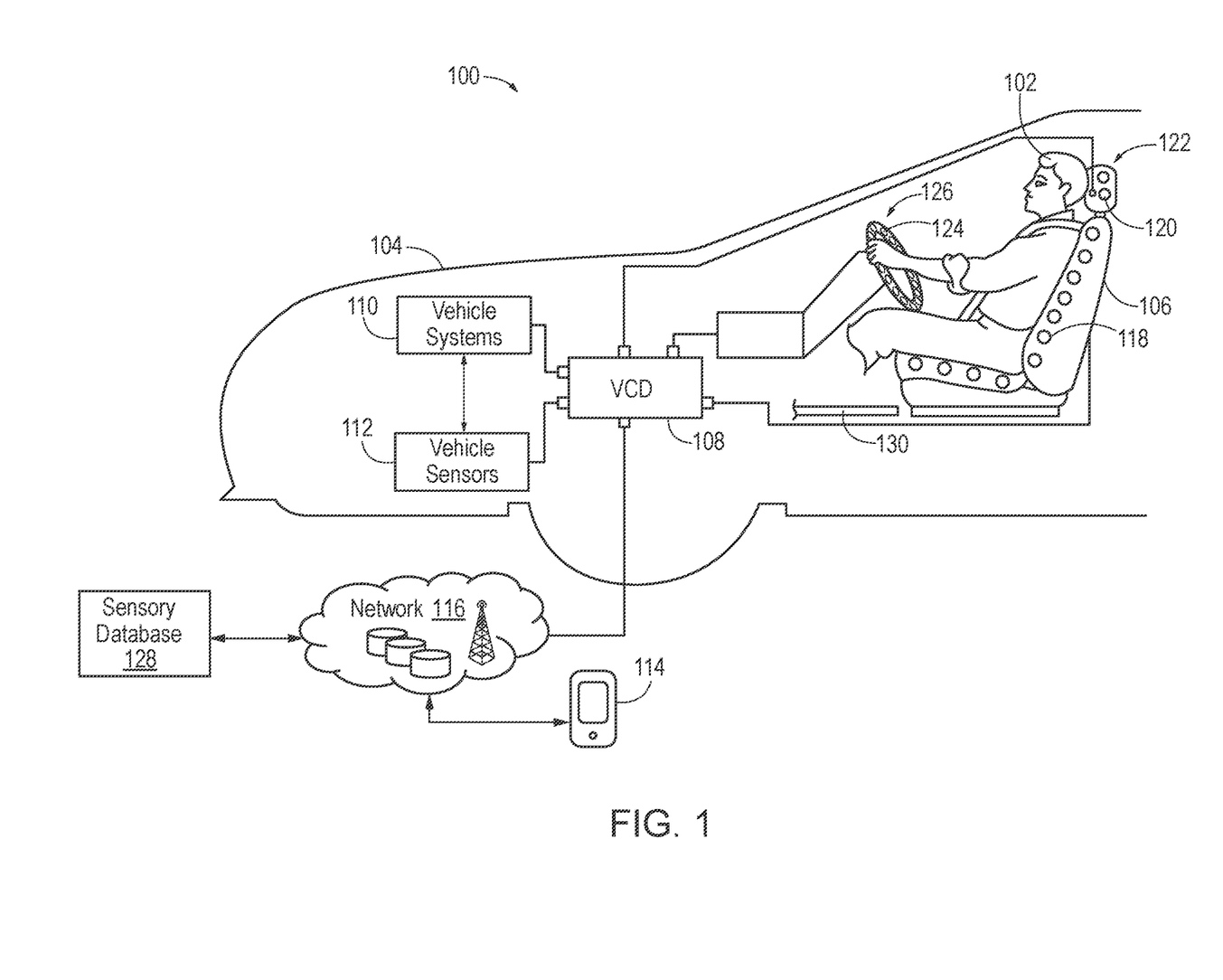
FIG. 1 is a schematic view of an operating environment for alleviating sensory conflict in a vehicle according to an exemplary embodiment.

Referring now to the drawings, the showings are for purposes of illustrating one or more exemplary embodiments and not for purposes of limiting the same. FIG. 1 is a schematic view of an operating environment 100 for alleviating sensory conflict experienced by a vehicle occupant 102 located in a vehicle 104 according to an exemplary embodiment. For example, the vehicle occupant 102 may be located in a seat 106 of the vehicle 104. The vehicle 104 also includes a vehicle computing device (VCD) 108, vehicle systems 110, and vehicle sensors 112. The components of the operating environment 100, as well as the components of other systems, hardware architectures, and software architectures discussed herein, may be combined, omitted, or organized into different architectures for various embodiments.

The VCD 108 can be implemented with the vehicle 104 as part of a telematics unit, a head unit, a navigation unit, an infotainment unit, an electronic control unit, among others. In other embodiments, the components and functions of the VCD 108 can be implemented remotely from the vehicle 104, for example, with a portable device 114 or another device connected via a network (e.g., a network 116). The VCD 108 may be capable of providing wired or wireless computer communications utilizing various protocols to send/receive electronic signals internally to/from components of the vehicle 104. Additionally, the VCD 108 may be operably connected for internal computer communication via a bus 210 (e.g., a Controller Area Network (CAN) or a Local Interconnect Network (LIN) protocol bus) to facilitate data input and output between the VCD 108 and the components of the vehicle 104.

Figure 2:
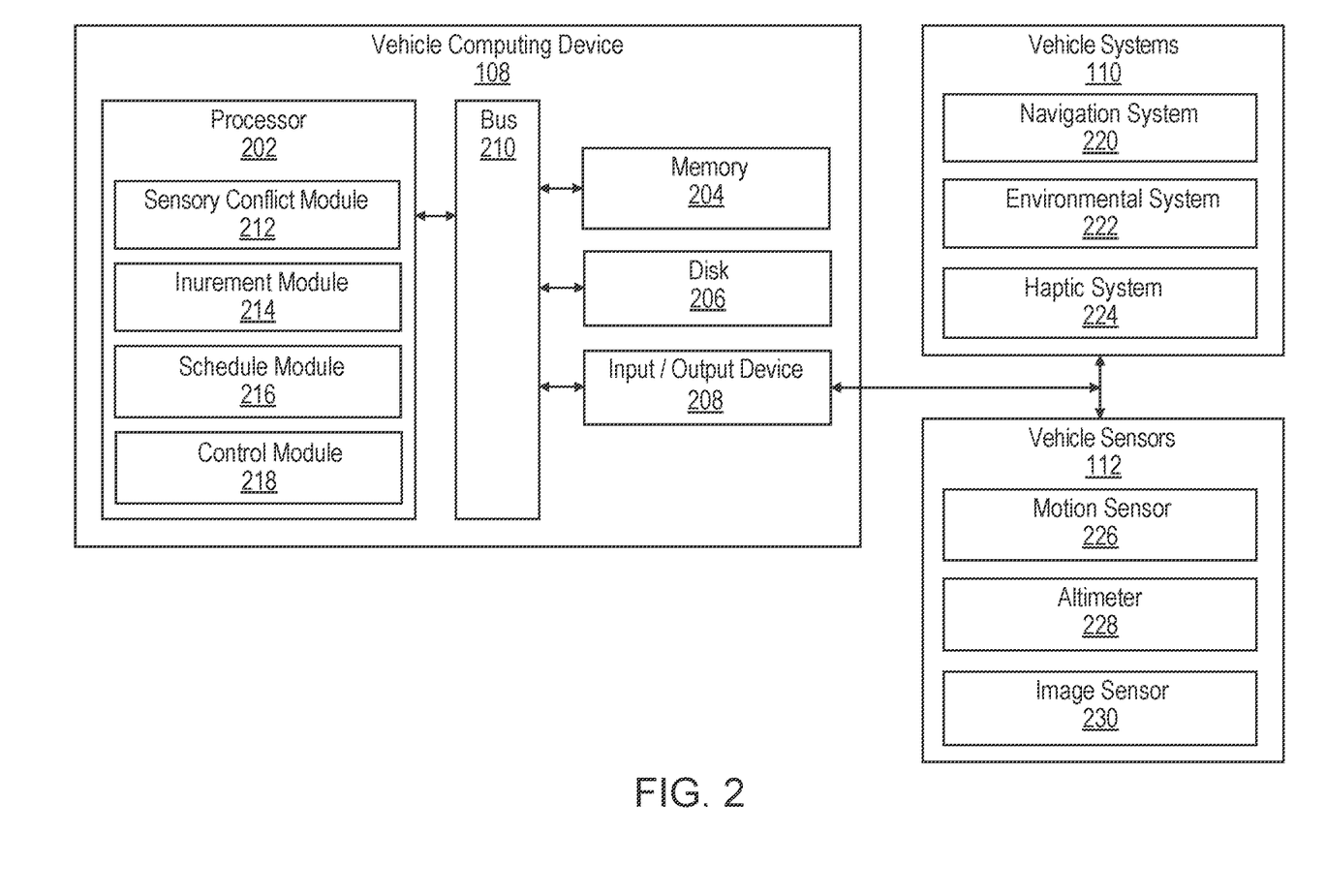
FIG. 2 is a schematic view of a vehicle computing device associated with vehicle systems and vehicle sensors according to an exemplary embodiment.

Turning to FIG. 2, the VCD 108 includes a processor 202, a memory 204, a disk 206, and an input/output (I/O) interface 208, which are each operably connected for computer communication via a bus 210 and/or other wired and wireless technologies. The I/O interface 208 provides software and hardware to facilitate data input and output between the components of the VCD 108 and other components, networks, and data sources, which will be described herein. Additionally, the processor 202 includes a sensory conflict module 212, an inurement module 214, a schedule module 216, and a control module 218, for alleviating sensory conflict facilitated by the components of the operating environment 100.

The VCD 108 is also operably connected for computer communication (e.g., via the bus 210 and/or the I/O interface 208) to one or more vehicle systems 110. The vehicle systems 110 can include, but are not limited to, any automatic or manual systems that can be used to enhance the vehicle, driving, and/or safety. Here, the vehicle systems 110 include a navigation system 220, an environmental system 222, and a haptic system 224 according to an exemplary embodiment. The navigation system 220 stores, calculates, and provides route and destination information and facilitates features like turn-by-turn directions. The environmental system 222 monitors, analyses, and retrieves information about the environment of the vehicle 104 including weather (e.g., temperature, precipitation, wind speed, glare, etc.), roadway conditions (e.g., detours, roadwork, road hazards, etc.), time of day, etc. The haptic system 224 generates, analyses, and stores signals for actuating haptic devices, such as seat actuators 118 situated within the seat 106, headrest actuators 120 situated within a headrest 122, and steering wheel actuators 124 within a steering wheel 126, as shown in FIG. 1. The haptic system 224 may also include feedback from the haptic devices.

Figure 3:
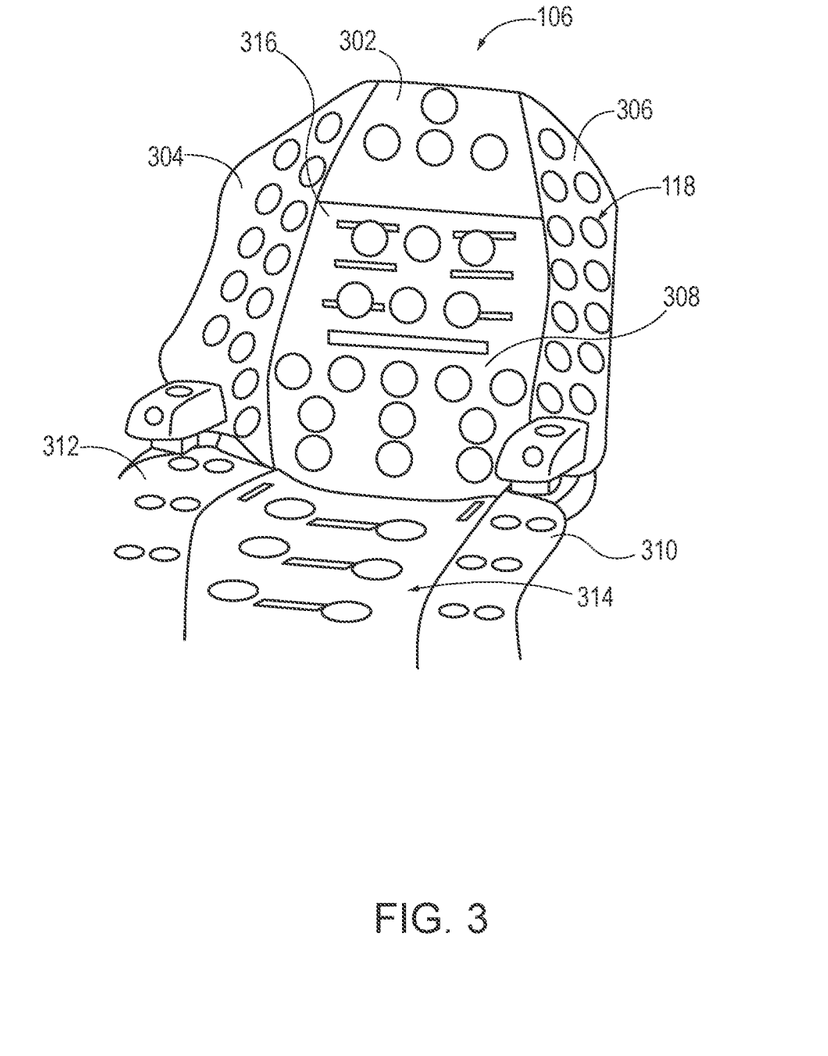
FIG. 3 is an illustrative view of haptic devices located within a seat of the vehicle according to an exemplary embodiment.

Although a single haptic device, the seat actuator 118, is shown in seat 106 of FIG. 1, a plurality of haptic devices may be deployed throughout the vehicle 104. FIG. 3 is an illustrative view of the haptic devices, such as the seat actuators 118 located within the seat 106 of the vehicle 104 according to an exemplary embodiment. In one embodiment, the haptic devices may include respective motors (not shown) that each include a processing unit (not shown) that is operably connected to send and receive data to/from the VCD 108. As discussed below, the VCD 108 and/or the control module 218 may send commands to one or more of the haptic devices to be actuated to provide one or more levels sensation to the vehicle occupant 102.

As shown in the illustrative view of FIG. 3, the haptic devices may include seat actuators 118 that are located (disposed) at one or more regions 302-316 of the seat 106. The seat actuators 118 are utilized to provide vibrations, movements, etc. towards one or more of the regions 302-316 of the seat 106 based on one or more inurement actions associated with identified sensory events. Any number of regions in addition to or in lieu of the regions 302-316 may be provided at one or more portions of each of the seat 106 of the vehicle 104. Furthermore, the seat 106 may be one or more seats in the vehicle 104. For example, the seat may be located in any part of the vehicle 104.

With particular reference to the seat actuators 118, the seat actuators 118 may be configured on one or more sensor pads (not shown) that may be included within one or more regions 302-316 of the seat 106 of the vehicle 104. In an additional embodiment, the sensor pad(s) may be included within one or more areas of the interior of the vehicle 104 that are in close proximity to the seat 106. For instance, the one or more sensor pads that include the seat actuators 118 may be located within a floor panel 130 that is located adjacent to the seat 106 or an arm rest (not shown) of a door (not shown) adjacent to the seat 106. In one or more configurations, the sensor pad(s) may be included under a layer of covering/ paneling (e.g., leather/cloth covering, plastic/wood/aluminum paneling) that is provided within numerous areas of the vehicle 104. The seat actuators 118 may be positioned/ disposed in various types of patterns and be actuated in any number of combinations to provide the vehicle occupant with the sensation of motion.

In one or more embodiments, the seat actuators 118 may additionally include motions sensors 226 capable of capturing movement data associated with the vehicle occupant 102. For example, the motion sensors 226 associated with the seat actuators 118 may be used to capture movement data that indicates that the vehicle occupant 102 is swaying in the seat 106. The movement data may be used to approximate the motion of the vehicle occupant 102 in the seat 106. The motion sensors 226 associated with the seat actuators 118 may include, but are not limited to, capacitive touch sensors, proximity sensors, weight sensors, vibration sensors, and the like that are configured to sense data associated with the vehicle occupant 102. In particular, the motion sensors 226 associated with the seat actuators 118 may be configured to sense the position and the shifting of weight of one or more areas of the vehicle occupant 102 within each seat of the vehicle 104. For example, the motion sensors 226 associated with the seat actuators 118 may be configured to sense a seated position of the vehicle occupant 102 within one of the seat 106 of the vehicle 104 as the weight applied to one or more regions 306-316. In addition to being associated with the seat actuators 118, the motion sensors 226 may also be configured to sense vibrations affecting the seat 106 of the vehicle 104. The motion sensors 226 of the seat 106 may output and communicate the movement data to the processor 202 of the VCD 108.

In an exemplary embodiment, the VCD 108 may also be operably connected to the image sensor 230 that may be disposed within the vehicle 104. The image sensors 230 may be configured to capture one or more images/video within the vehicle 104 including the seat 106. In one embodiment, upon the image sensors 230 capturing one or more images/ video, the image sensors 230 may be configured to execute an image logic to determine the positions of one or more areas of each vehicle occupant's body within the seat 106. In another embodiment, the image logic may be associated with the processor 202 of the VCD 108.

In particular, the image logic may be executed by one or more image sensors 230 to output image data to the VCD 108 that includes data associated with the positions of one or more areas of the vehicle occupant's body (e.g., head, torso, thighs, hips) as the vehicle occupant 102 is seated within the seat 106. As discussed below, the control module 218 may aggregate data provided by the image sensors 230 with sensor data provided by the seat actuators 118 to determine the disposition of the vehicle occupant 102 seated within the seat 106 or that the vehicle occupant 102 is moving or swaying in the seat 106, which may be indicative that the vehicle occupant 102 is experiencing a sensory conflict.

Returning to FIG. 2, the vehicle systems 110 include and/or are operably connected for computer communication to the vehicle sensors 112. The vehicle sensors 112 provide and/or sense information associated with the vehicle, the vehicle environment, and/or the vehicle systems 110. The vehicle sensors 112 may include the motion sensor 226 that senses motion associated with the vehicle 104, an altimeter 228 that measures the altitude of the vehicle 104, and the image sensor 230 such as a camera, an optical sensor, and/or infrared sensor. The vehicle sensors 112 can also include, but are not limited to, vehicle sensors associated with the vehicle systems 110, other vehicle sensors associated with the vehicle 104 that collect data regarding the vehicle 104 and the vehicle environment. The vehicle sensors 112 can include, but are not limited to, environmental sensors, vehicle speed sensors, accelerator pedal sensors, brake sensors, wheel sensors, among others. In some embodiments, the vehicle sensors 112 are incorporated with the vehicle systems 110. For example, one or more vehicle sensors of the vehicle sensors 112 may be incorporated with the navigation system 220 to monitor characteristics of the vehicle 104, such as location and speed.

Accordingly, the vehicle sensors 112 are operable to sense a measurement of data associated with the vehicle, the vehicle environment, the vehicle systems 110, the vehicle 104, and/or the proximate vehicles and generate a data signal indicating said measurement of data. These data signals can be converted into other data formats (e.g., numerical) and/or used by the vehicle systems 110 and/or the VCD 108 to generate other data metrics and parameters. It is understood that the sensors can be any type of sensor, for example, acoustic, electric, environmental, optical, imaging, light, pressure, force, thermal, temperature, proximity, among others.

The VCD 108 is also operatively connected for computer communication to the network 116 and a sensory conflict database 128. It is understood that the connection from the I/O interface 208 to the network 116, and the sensory conflict database 128 can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. It some embodiments, the sensory conflict database 128 could be located on-board the vehicle, at for example, the memory 204 and/or the disk 206. In other embodiments, the sensory conflict database 128 can be distributed in one or more locations.

The network 116 is, for example, a data network, the Internet, a wide area network (WAN) or a local area (LAN) network. The network 116 serves as a communication medium to various remote devices (e.g., databases, web servers, remote servers, application servers, intermediary servers, client machines, other portable devices). In some embodiments, the sensory conflict database 128 may be included in the network 116, accessed by the VCD 108 through the network 116, and/or the network 116 can access the sensory conflict database 128. Thus, in some embodiments, the VCD 108 can obtain data from the sensory conflict database 128 locally or via the network 116.

Using the system and network configuration discussed above, the vehicle 104 can provide inurement actions to the vehicle occupant 102 in the vehicle 104 to gradually and incrementally acclimatize or desensitize the vehicle occupant to a sensory event causing a sensory conflict. Detailed embodiments describing exemplary methods using the system and network configuration discussed above will now be discussed in detail.

II. Application of Systems and Methods

Figure 4:
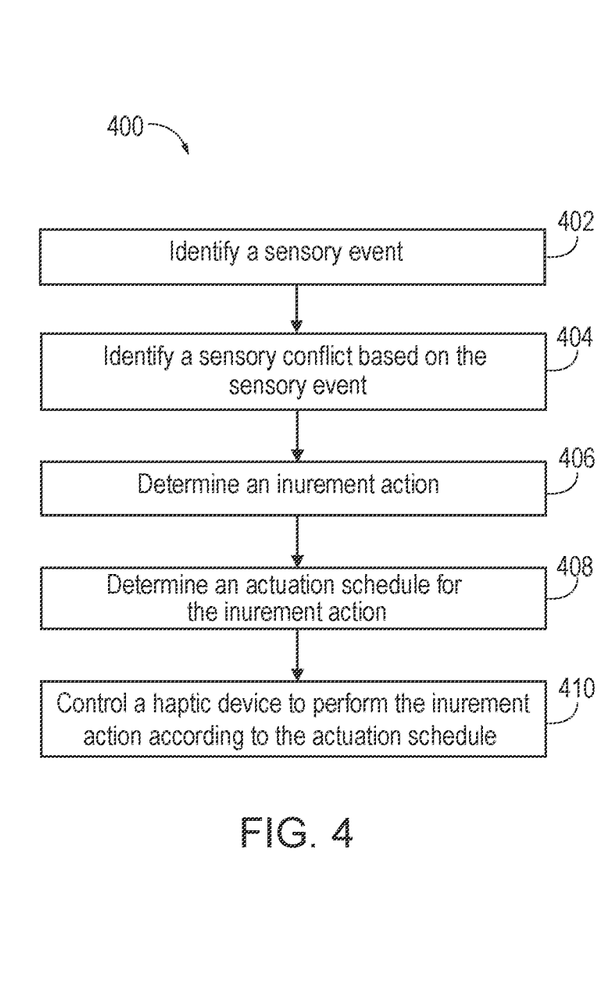
FIG. 4 is a process flow diagram of a method for alleviating sensory conflict in a vehicle according to an exemplary embodiment.

Referring now to FIG. 4, a method 400 for alleviating sensory conflict will now be described according to an exemplary embodiment. FIG. 4 will also be described with reference to FIGS. 1-3. The elements of the method 400 can be organized into different architectures, blocks, stages, and/or processes.

At block 402, the sensory conflict module 212 identifies that the vehicle occupant 102, the vehicle 104, and/or the environment of the vehicle 104 has been subject to a sensory event. A sensory event is a condition of the vehicle occupant 102, the vehicle 104, or the environment of the vehicle that increases the likelihood of the vehicle occupant 102 experiencing a sensory conflict. As one example, the sensory event may be that the vehicle occupant 102 recently spent time on a boat, which could result in the sensory conflict of sea sickness. As another example, the sensory event may be the vehicle occupant 102 reading in the vehicle 104 which results in the vehicle occupant 102 experiencing the sensory conflict of car sickness. As yet another example, the vehicle 104 may be climbing a steep slope in windy conditions, which may result in the vehicle 104 moving laterally and the vehicle occupant 102 experiencing the sensory conflict of car sickness. Accordingly, the sensory event is a precipitating event that increases the likelihood of the vehicle occupant 102 suffering from a sensory conflict. Furthermore, as illustrated by these examples, the sensory event may have already occurred, be occurring, or be about to occur.

The sensory conflict module 212 may identify the sensory event based on data received from the vehicle systems 110 and/or the vehicle sensors 112, among others. For example, the navigation system 220 may provide navigational data to the sensory conflict module 212 that the roadway ahead is winding or steep. The environmental system 222 may provide environmental data to the sensory conflict module 212 that high winds are expected or occurring at a point between the vehicle 104 and the destination of the vehicle 104. The altimeter 228 may provide altitude data to the sensory conflict module 212 that indicates that the vehicle 104 is a threshold height above sea level. The motion sensors 226 may provide movement data to the sensory conflict module 212 that the vehicle occupant is swaying side to side or rocking back and forth.

Additionally or alternatively, the image sensor 230 may indicate that the vehicle occupant is focused on a point within the vehicle 104. For example, the sensory conflict module 212 may include the image logic, on the processor 202, as discussed above, that performs image processing to determine the direction of the gaze of the vehicle occupant 102. The image logic may further determine that the vehicle occupant is focused on an object (e.g., a book, a magazine, a crossword, a portable device, etc.). The image logic may also determine the gaze duration. Based on the data received from the vehicle systems 110 and/or the vehicle sensors 112, the sensory conflict module 212 identifies a sensory event. Here, the sensory event may be reading in a moving vehicle, based on the gaze duration as well as the navigational data regarding the vehicle 104.

In one embodiment, the sensory events associated with the vehicle occupant 102 may include the previous location of the vehicle occupant 102. For example, the navigational data from the navigation system 220 of the vehicle 104 may indicate that the destination of the vehicle 104 was a harbor or marina. Alternatively, the navigational data may indicate that the vehicle 104 was parked at a harbor or marina for a threshold amount of time. In another embodiment, portable device data, such as global positioning system (GPS) data, from the portable device 114 may indicate that the vehicle occupant 102 was located on water. Here, the sensory conflict module 212 may identify that the sensory event is the vehicle occupant 102 being at sea.

In some embodiment, the sensory even may be identified when the sensory conflict module 212 receives data corresponding to an event threshold. For example the event threshold may define two or more sensory instances as a sensory event. Suppose the vehicle occupant 102 is swaying in the seat 106 of the vehicle 104. The sensory conflict module 212 may receive movement data from the motion sensors 226 that indicates the vehicle occupant 102 is moving laterally in the seat 106, which corresponds to a first sensory instance. However, based on the event threshold, the sensory conflict module 212 may not be able to identify a sensory event based on the first sensory instance alone. Instead, the sensory module may rely on a second sensory instance to trigger the identification of a sensory event. For example, the sensory module may utilize portable device data showing that the vehicle occupant was surrounded by water for at least a predetermined amount of time as a second sensory instance. Together, the first sensory instance and the second sensory instance may satisfy the event threshold, resulting in the sensory conflict module 212 identifying that a sensory event has taken place. While described as two instances, the event threshold may be any number of sensory instances. Alternatively, the event threshold may be a specific combination of sensory instances. Furthermore, the event threshold may be set based on a sensory instance satisfying a predetermined level, value, or timing.

At block 404, the sensory conflict module 212 identifies a sensory conflict based on the identified sensory event. Continuing the example from above, the sensory conflict module 212 may identify a sensory conflict as motion sickness, debarkation sickness (i.e., mal de debarquement syndrome), vertigo, etc. As shown in the example, a sensory conflict is a discontinuity in the senses of the vehicle occupant 102 that may cause the vehicle occupant 102 to feel ill. The sensory conflict is based on the type of sensory event. For example, the sensory conflict module 212 may have associations between sensory event and sensory conflicts, such that identification of a particular sensory event automatically triggers identification of a corresponding sensory conflict. As another example, the sensory conflict module 212 may use a look-up table to identify a sensory conflict based on the sensory event. For example, suppose that the sensory conflict module 212 receives image data with a gaze direction, an object identification, and/or a gaze duration. The sensory conflict module 212 may identify the sensory event as the vehicle occupant 102 being focused on a stationary object in the vehicle, reading, or using a portable device 114, among other activities based on the image data. The vehicle occupant 102 being focused on a stationary object in the vehicle, reading, or using a portable device 114 may be individually associated with car sickness via a look-up table. In other embodiments, the sensory conflict module 212 accesses the sensory conflict database 128, locally or remotely, to identify the sensory conflict based on the identified sensory event. For example, the sensory conflict database 128 may associate the vehicle occupant 102 being focused on a stationary object in the vehicle, reading, or using a portable device 114 with car sickness.

At block 406, the inurement module 214 determines an inurement action to alleviate an impact of the sensory conflict on the vehicle occupant 102. In some embodiments the inurement action may be formulated to emulate the sensory event. For example, suppose that the sensory conflict of motion sickness based on the sensory event of the vehicle occupant 102 being on a boat. The inurement action may approximate the rocking motion of a boat. Accordingly, the inurement module 214 formulates an inurement action that utilizes the haptic devices of the vehicle 104 to actuate in a manner that would result in the vehicle occupant experiencing a rocking motion. For example, the inurement module 214 may determine that by activating a set of the seat actuators 118 in a specific pattern creates a rocking sensation. Additionally, the inurement action may be based on environmental data. For example, the environmental data received locally from the environmental system 222 or remotely over the network 116 may indicate rough seas. Accordingly, the intensity of the inurement action may be formulated to approximate the intensity of the environmental condition. In another embodiment, the inurement action may be formulated to approximate the intensity of the environmental condition to a predetermined degree, for example, a specified percentage, such as 50% of the intensity indicated by the environmental data.

The inurement action may also be formulated to counteract a motion associated with the sensory event. In one embodiment, the inurement module 214 may formulate the inurement action based on the movement that the vehicle 104 is exhibiting. For example, the vehicle sensors 112 may determine that the vehicle 104 is vibrating due to, for example, the condition of the roadway, the weather, etc. The vehicle sensors 112 may output a vibration signal including one or more values (e.g., numeric levels) that may be analyzed by the inurement module 214 to determine vehicular vibrations that may affect the chassis and the seat 106 of the vehicle 104 at one or more particular regions 302-316. Additionally, the vibration signal may also be analyzed by the inurement module 214 to determine road vibrations that are associated with bumps, potholes, unevenness of a roadway on which the vehicle 104 is traveling that may affect the chassis and the seat 106. Accordingly, the inurement module 214 may analyze the vibration data and may determine one or more inurement actions associated with one or more vehicular vibrations and/or road vibrations affecting each seat 106 of the vehicle 104. In one embodiment, the inurement module 214 may formulate an inurement action that counteracts the vibrations. For example, the inurement action may utilize the seat actuators 118 to cancel out the vibrations sensed in the seat 106 of the vehicle 104, specifically at the one or more regions 302-316.

In addition to the seat actuators 118, the inurement module 214 may utilize the headrest actuators 120 and steering wheel actuators 124 among other haptic devices in the vehicle 104. The inurement action may employ any number of haptic devices in different configurations, combinations, and/or patterns. The inurement action may employ one or more of the haptic devices for varying lengths of time. For example a first seat actuator of the seat actuators 118 may be employed for a first period of time and a second seat actuator of the seat actuators 118 may employed for a second period of time that is different than the first period of time. Moreover, the inurement action may employ one or more of the haptic devices at different times. For example, to create a rocking motion, a first seat actuator of the seat actuators 118 may be actuated at a first time for the first period of time and a second seat actuator of the seat actuators 118 may actuated at a second time when the first period of time elapses. In this manner, the inurement module 214 can individually set the haptic devices for different start times, for different lengths of time, at varying intensities in different configurations, combinations, and/or patterns to formulate an inurement action to alleviate an impact of the sensory conflict on the vehicle occupant 102.

At block 408, the schedule module 216 determines an actuation schedule for performing the inurement action. The schedule may include the number of times that the inurement action is to be performed, the length of the period of time that each inurement action is to be performed, the intensity of each inurement action, etc. For example, the schedule module 216 may determine that the schedule includes a single actuation of the inurement action. Suppose the image sensors 230 of the vehicle 104 determine that the vehicle 104 is approaching a pothole. The schedule module 216 may actuate the inurement action a single time to coincide with the vehicle 104 traversing the pothole to offset the vibrational effects of the impact. For alternate sensory conflicts the schedule module 216 may iteratively schedule the inurement action to alleviate an impact of the sensory conflict on the vehicle occupant 102.

Returning to the example from above, suppose that the vehicle occupant 102 is experiencing motion sickness based on the sensory event of the vehicle occupant 102 being on a boat. The schedule module 216 may determine that the inurement action should be performed ten times, each inurement action lasting one minute. In another embodiment, the schedule module 216 may schedule the inurement actions to taper of such that each inurement action lasts for less time than the previously scheduled inurement action. Conversely, the schedule module 216 may schedule the inurement actions to build, such that each inurement action last longer than the previously scheduled inurement action. Therefore, the schedule module 216 schedules the total inurement action, whereas the inurement module 214 formulated the inurement action based on the individual haptic devices which could be scheduled.

The schedule module 216 may schedule the inurement actions based on a variety of factors including the severity of the sensory event, the length of the sensory event, the condition of the vehicle occupant 102, changes in the vehicle occupant 102, as well as sensed data, for example, the vibration signal of the vehicle sensors 112. Furthermore, portions of the inurement action may be parsed and scheduled to actuate at different times.

At block 410, the control module 218 controls a haptic device to perform the inurement action according to the actuation schedule in response to the vehicle occupant 102 being located in a seat of the vehicle. The haptic devices may include seat actuators 118 situated within the seat 106, the headrest actuators 120 situated within a headrest 122, and the steering wheel actuators 124 within the steering wheel 126, among others. In an exemplary embodiment, the control module 218 may communicate one or more commands to the VCD 108 to control one or more of the haptic devices. In another embodiment, the control module 218 may communicate one or more commands directly to one or more of the haptic devices, such as the seat actuators 118 disposed within one or more regions 302-316 of the seat 106 to provide various types of inurement actions at one or more levels.

Figure 5:
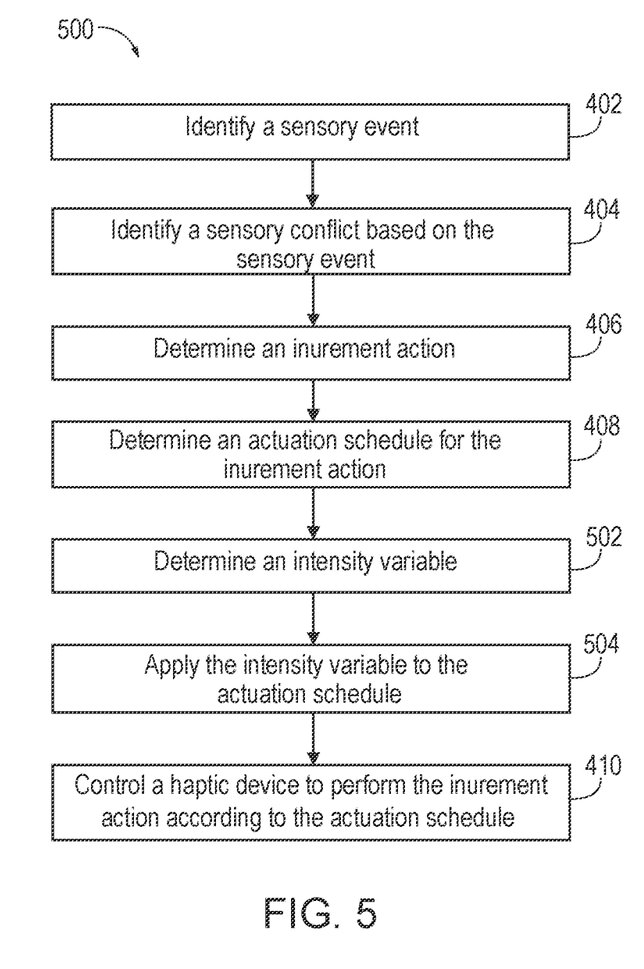
FIG. 5 is a process flow diagram of a method for varying intensity of inurement actions according to an exemplary embodiment.

FIG. 5 is a process flow diagram of a method for varying intensity of inurement actions according to an exemplary embodiment. FIG. 5 will be described with reference to the components of FIGS. 1-4, though it is to be appreciated that the method 500 of FIG. 5 may be used with additional and/or alternative system components. Furthermore, the method 500 includes similar steps as the method 400 that operate in a similar manner as described above with respect to FIG. 4.

At block 402, the method 500 includes identifying that the vehicle occupant 102, the vehicle 104, and/or the environment of the vehicle 104 has been subject to a sensory event. Suppose that the GPS data of the portable device 114 indicates that the vehicle occupant 102 was located over water for several hours and, accordingly, the sensory event is identified as probable boat travel. In this manner, the sensory event may be experienced by the vehicle occupant 102 when the vehicle occupant 102 is remotely located from the vehicle 104.

At block 404, the method 500 includes identifying a sensory conflict based on the identified sensory event. In one embodiment, the sensory conflict module 212 may access the sensory conflict database 128 to determine the sensory conflict associated with probable boat travel. For example, the sensory conflict module 212 may query the sensory conflict database 128 and receive a response from the sensory database including a sensory conflict. Here the sensory conflict module 212 may receive a response that indicates that the sensory conflict associated with the sensory event, probable boat travel, is debarkation sickness.

At block 406, the method 500 includes determining an inurement action to alleviate an impact of the sensory conflict on the vehicle occupant 102. For example, because a symptom of debarkation sickness is the feeling of rocking even when stationary due to the rocking of the boat during the sensory event, the inurement module 214 may determine an inurement action of rocking. In this manner, the inurement action may approximate the conditions of the sensory event as experienced by the vehicle occupant 102.

At block 408, the method 500 includes determining an actuation schedule for performing the inurement action. The schedule module 216 may determine that repeated exposure to the inurement action over a defined period is associated with reducing the sensory conflict experienced by the vehicle occupant 102 in the vehicle 104. Accordingly, the schedule module 216 may schedule the inurement action to happen once every five minutes over a half hour. Accordingly, the schedule module 216 determines that the N number of times that the inurement action are to be performed includes a first inurement action, a second inurement action, a third inurement action, a fourth inurement action, a fifth inurement action, and a sixth inurement action, each separated by a break period.

The method 500 also includes, at block 502, determining an intensity variable that varies the intensity of inurement actions performed the N number of times. For example the intensity variable may define that the intensity level of the inurement actions should increase or decrease. In some embodiments, the intensity variable may define that successive inurement actions should increase intensity by one preset level with each iteration. Continuing the example from above, suppose that the inurement module 214 defines the inurement action to be performed at a level five intensity and the schedule module 216 defines the intensity variable as a decrease by one level per iteration. Then based on the intensity variable, the first inurement action is performed at a level five, the second inurement action is performed at a level four, the third inurement action at a level three, a fourth inurement action at a level two, and the fifth inurement action and a sixth inurement action at a level one. Thus, the schedule module 216 applies the intensity variable to the action schedule accordingly.

In another embodiment, the schedule module 216 may define the intensity variable such that the intensity of the inurement action increases over the N number of times based on an external condition of the vehicle systems 110 and/or the vehicle sensors 112. For example, the intensity variable may be based on the navigation data, environmental data, image processing, etc. In one embodiment, the intensity variable may define an intensity increase when the vehicle 104 is approaching a location such as a destination or attraction. The location and an estimated time of arrival may be based on the navigation data of the navigation system 220. The intensity variable may be define to start at a first level and continue to a second level by the estimated time of arrival. Conversely, the schedule module 216 may define the intensity variable such that the intensity of the inurement action decreases over the N number of times. For example, the intensity variable may decrease as the vehicle 104 is retreating from the location.

Additionally, the intensity variable may change the break period between iterations of the inurement action. For example, lengths of the break periods may be based on a preceding intensity of a preceding inurement action. Returning to the example in which the first inurement action is performed at a level five, the second inurement action is performed at a level four, the third inurement action at a level three, a fourth inurement action at a level two, and the fifth inurement action and a sixth inurement action at a level one, the length of the first break period between first inurement action and the second inurement action may be longer than a second break period between the second inurement action and the third inurement action. This is because the collective intensity levels on either side of the first break period is greater than the collective intensity levels on either side of the second break period. In this way the intensity variable can also affect the length of the break periods.

At block 504, the intensity variable is applied to the actuation schedule. The intensity variable may be applied to the actuation schedule automatically or based on an intensity parameter. For example, the intensity variable may be applied based on a user selection, proximity to a location (e.g., a destination), user data received from one or more of the vehicle systems 110 and/or the vehicle sensors 112, and vehicle data received from one or more of the vehicle systems 110 and/or the vehicle sensors 112, among others.

At block 410, the method 500 includes controlling a haptic device to perform the inurement action according to the actuation schedule and the intensity variable in response to the vehicle occupant 102 being located in a seat of the vehicle.

Figure 6:
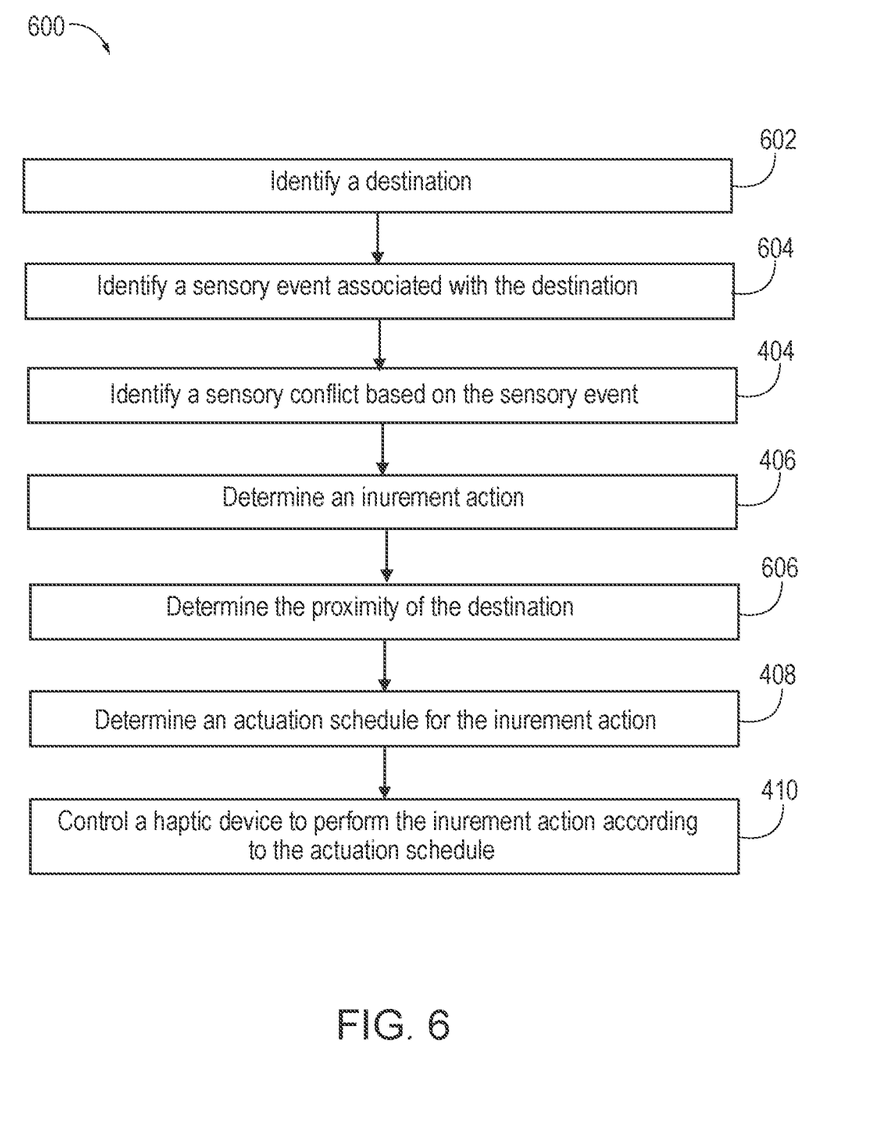
FIG. 6 is a process flow diagram of a method determining an actuation schedule based on proximity to a location according to an exemplary embodiment.

FIG. 6 is a process flow diagram of a method determining an actuation schedule based on proximity to a location according to an exemplary embodiment. FIG. 6 will be described with reference to the components of FIGS. 1-4, though it is to be appreciated that the method 600 of FIG. 6 may be used with additional and/or alternative system components. Furthermore, the method 600 includes similar steps as the method 400 that operate in a similar manner as described above with respect to FIG. 4.

At block 602 of the method 600, a destination is identified. In the example discussed above with respect to FIG. 5, the sensory event was previously experienced by the vehicle occupant 102 at a destination determined based on the GPS data of the portable device 114. Alternatively, the destination may be identified based on the navigation data of the navigation system 220. In particular, the sensory conflict module 212 may identify the destination based on a destination used for navigation. For example, suppose that the navigation system 220 is navigating to a marina. Accordingly, the sensory conflict module 212 may identify the marina as the destination. Accordingly, the destination may be determined based on data received locally or remotely.

At block 604, the method 600 includes identifying a sensory event that is associated with the destination. Because the destination was determined to be an arena at block 602, the sensory event may be identified as probable boat travel. Therefore, the same sensory event can be identified given different circumstances and as a past event or a future event.

At block 404, the method 600 includes identifying a sensory conflict based on the identified sensory event. Identifying the sensory conflict may be based on whether the sensory event takes place in the past present or future. For example, with respect to FIG. 5, the sensory conflict module 212 is identified as debarkation sickness because the vehicle occupant 102 was previously at the destination. In this example, the sensory conflict may be determined as a sensory conflict the vehicle occupant 102 is likely to suffer. For example, the sensory conflict may be based on user data associated with the vehicle occupant 102. In one embodiment, the sensory conflict database 128 may store user data specific to the vehicle occupant 102. Suppose the vehicle occupant 102 typically experiences motion sickness after visiting the harbor as evidenced by the actions of the vehicle occupant 102 after visiting the destination. The sensory conflict module 212 may identify the sensory conflict as motion sickness based on the destination of the marina and, in some embodiments, the user data.

At block 406, the method 600 includes determining an inurement action to alleviate an impact of the sensory conflict on the vehicle occupant 102. For example, because a symptom of motion sickness is the feeling of nausea due to the rocking of the boat, the inurement module 214 may determine an inurement action to alleviate the nausea by desensitizing the vehicle occupant 102 by approximating the rocking.

At block 606, the method 600 includes determining the proximity of the destination. In some embodiments, the proximity may be measured as the estimated time of arrival, the amount of time elapsed since leaving the destination, or distance from the destination, among others.

At block 408, the method 600 includes determining an actuation schedule for performing the inurement action. The schedule module 216 may determine that repeated exposure to the inurement action over a defined period is associated with desensitizing the sensory conflict. Accordingly, the schedule module 216 may schedule the inurement action to happen once every five minutes until the destination is reached.

At block 410, the control module 218 controls a haptic device to perform the inurement action according to the actuation schedule in response to the vehicle occupant 102 being located in a seat of the vehicle. The haptic devices may include seat actuators 118 situated within the seat 106, the headrest actuators 120 situated within a headrest 122, and the steering wheel actuators 124 within the steering wheel 126, among others. In this manner, the sensory conflict can be alleviated by reducing the effects by desensitizing the vehicle occupant 102 or reducing the symptoms of the sensory conflict experienced by the vehicle occupant 102.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for alleviating sensory conflict in a vehicle, comprising:
   identifying a sensory event based on data from vehicle systems or vehicle sensors of the vehicle;
   identifying a sensory conflict for a vehicle occupant based on the sensory event at a location;
   determining an inurement action to alleviate an impact of the sensory conflict on the vehicle occupant;
   determining an actuation schedule for performing the inurement action an N number of times for a predetermined amount of time;
   determining an intensity variable that varies an intensity of inurement actions performed the N number of times, wherein the intensity variable increases the intensity of the inurement actions over the N number of times when the vehicle is approaching the location, wherein the N number of times are separated by break periods, and wherein lengths of the break periods are based on a preceding intensity of a preceding inurement action;
   applying the intensity variable to the actuation schedule; and
   controlling a haptic device to perform the inurement action according to the actuation schedule in response to the vehicle occupant being located in a seat of the vehicle.

2. The computer-implemented method of claim 1, wherein the inurement action approximates motion of the vehicle occupant experienced by the vehicle occupant in response to the sensory event.

3. The computer-implemented method of claim 1, wherein the sensory event is determined based on environmental data or navigational data associated with the location.

4. The computer-implemented method of claim 1, wherein the sensory event is experienced by the vehicle occupant when the vehicle occupant is remotely located from the vehicle.

5. The computer-implemented method of claim 1, wherein the sensory event is based on an attraction at the location.

6. The computer-implemented method of claim 1, wherein the intensity variable decreases the intensity of the inurement actions over the N number of times when the vehicle is retreating from the location.

7. The computer-implemented method of claim 1, wherein the haptic device is located in the seat of the vehicle that is occupied by the vehicle occupant, and wherein the inurement action causes a movement in the seat.

8. A system for alleviating sensory conflict in a vehicle, comprising:
   a processor having:
   a sensory conflict module identifies a sensory conflict for a vehicle occupant based on a sensory event at a location;
   an inurement module determines an inurement action to alleviate an impact of the sensory conflict on the vehicle occupant and an intensity variable that varies an intensity of inurement actions performed N number of times, wherein the N number of times are separated by break periods, and wherein lengths of the break periods are based on a preceding intensity of a preceding inurement action;
   a schedule module determines an actuation schedule for performing the inurement action an N number of times for a predetermined amount of time based on the intensity variable; and
   a control module controls a haptic device to perform the inurement action according to the actuation schedule in response to the vehicle occupant being located in a seat of the vehicle.

9. The system of claim 8, wherein the inurement action approximates motion of the vehicle occupant experienced by the vehicle occupant in response to the sensory event.

10. The system of claim 8, wherein the sensory event is determined based on environmental data or navigational data associated with the location.

11. The system of claim 8, wherein the sensory event is experienced by the vehicle occupant when the vehicle occupant is remotely located from the vehicle.

12. The system of claim 8, wherein the sensory event is based on an attraction at the location.

13. The system of claim 8, wherein the intensity variable increases the intensity of the inurement actions over the N number of times when the vehicle is approaching the location, and wherein the intensity variable decreases the intensity of the inurement actions over the N number of times when the vehicle is retreating from the location.

14. A non-transitory computer readable storage medium storing instructions that when executed by a computer, which includes a processor perform a method, the method comprising:
   identifying a sensory conflict for a vehicle occupant of a vehicle based on a sensory event at a location;
   determining an inurement action to alleviate an impact of the sensory conflict on the vehicle occupant;
   determining an actuation schedule for performing the inurement action an N number of times for a predetermined amount of time;
   determining an intensity variable that varies an intensity of inurement actions performed the N number of times, wherein the intensity variable increases the intensity of the inurement actions over the N number of times when the vehicle is approaching the location, and wherein the N number of times are separated by break periods, and wherein lengths of the break periods are based on a preceding intensity of a preceding inurement action;
   applying the intensity variable to the actuation schedule; and
   controlling a haptic device to perform the inurement action according to the actuation schedule in response to the vehicle occupant being located in a seat of the vehicle.

15. The non-transitory computer readable storage medium of claim 14, wherein the intensity variable decreases the intensity of the inurement actions over the N number of times when the vehicle is retreating from the location.

* * * * *